(12) United States Patent
Shishido et al.

(10) Patent No.: US 12,480,964 B2
(45) Date of Patent: Nov. 25, 2025

(54) SPECIMEN TRANSPORT SYSTEM AND SPECIMEN TRANSPORT METHOD

(71) Applicant: Hitachi High-Tech Corporation, Tokyo (JP)

(72) Inventors: Daigo Shishido, Tokyo (JP); Kuniaki Onizawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 752 days.

(21) Appl. No.: 17/794,458

(22) PCT Filed: Jan. 7, 2021

(86) PCT No.: PCT/JP2021/000410
§ 371 (c)(1),
(2) Date: Jul. 21, 2022

(87) PCT Pub. No.: WO2021/157280
PCT Pub. Date: Aug. 12, 2021

(65) Prior Publication Data
US 2023/0070391 A1  Mar. 9, 2023

(30) Foreign Application Priority Data
Feb. 5, 2020  (JP) .................. 2020-018352

(51) Int. Cl.
*G01N 35/04* (2006.01)
*B65G 54/02* (2006.01)

(52) U.S. Cl.
CPC .............. *G01N 35/04* (2013.01); *B65G 54/02* (2013.01); *G01N 2035/0477* (2013.01); *G01N 2035/0491* (2013.01)

(58) Field of Classification Search
CPC .......... G01N 35/04; G01N 2035/0477; G01N 2035/0491; G01N 2035/0406; B65G 54/02; H02K 41/03
See application file for complete search history.

(56) References Cited

U.S. PATENT DOCUMENTS

| 2017/0138971 A1 | 5/2017 | Heise et al. |
| 2018/0188280 A1 | 7/2018 | Malinowski |

(Continued)

FOREIGN PATENT DOCUMENTS

| JP | 5-153704 A | 6/1993 |
| JP | 2004117052 A * | 4/2004 |

(Continued)

OTHER PUBLICATIONS

International Preliminary Report on Patentability (PCT/IB/338 & PCT/IB/373) issued in PCT Application No. PCT/JP2021/000410 dated Aug. 18, 2022, including English translation of document C2 (Japanese- language Written Opinion (PCT/ISA/237) filed on Jul. 21, 2022) (five (5) pages).

(Continued)

*Primary Examiner* — John Mcguirk
(74) *Attorney, Agent, or Firm* — Crowell & Moring LLP

(57) ABSTRACT

Provided are a specimen transport system and a specimen transport method that support a transport method using an electromagnetic actuator and can transport a specimen at higher speed and more stably as compared to the related art. A plurality of detection points each configured by a magnetic pole 207 and detecting a position of a magnetic body 203, and a plurality of transport paths provided above the plurality of detection points so as to cover the plurality of detection points are provided, in which among the plurality of transport paths, detection ranges 301A, 301B, and 301C of first detection points constituting a first transport path are different from detection ranges 301A, 301B, and 301C of (Continued)

second detection points constituting a second transport path different from the first transport path.

10 Claims, 9 Drawing Sheets

(56) References Cited

U.S. PATENT DOCUMENTS

| | | |
|---|---|---|
| 2018/0210001 A1 | 7/2018 | Reza |
| 2018/0348244 A1 | 12/2018 | Ren |

FOREIGN PATENT DOCUMENTS

| | | | |
|---|---|---|---|
| JP | 2017-77971 A | 4/2017 | |
| JP | 2018-109620 A | 7/2018 | |
| JP | 2018-119962 A | 8/2018 | |
| JP | 2018-205310 A | 12/2018 | |
| WO | WO 2019/082750 A1 | 5/2019 | |
| WO | WO-2019225284 A1 * | 11/2019 | ............ H02P 25/064 |

OTHER PUBLICATIONS

International Search Report (PCT/ISA/210) issued in PCT Application No. PCT/JP2021/000410 dated Feb. 9, 2021 with English translation (five (5) pages).

Japanese-language Written Opinion (PCT/ISA/237) issued in PCT Application No. PCT/JP2021/000410 dated Feb. 9, 2021 (three (3) pages).

* cited by examiner

[FIG. 1]
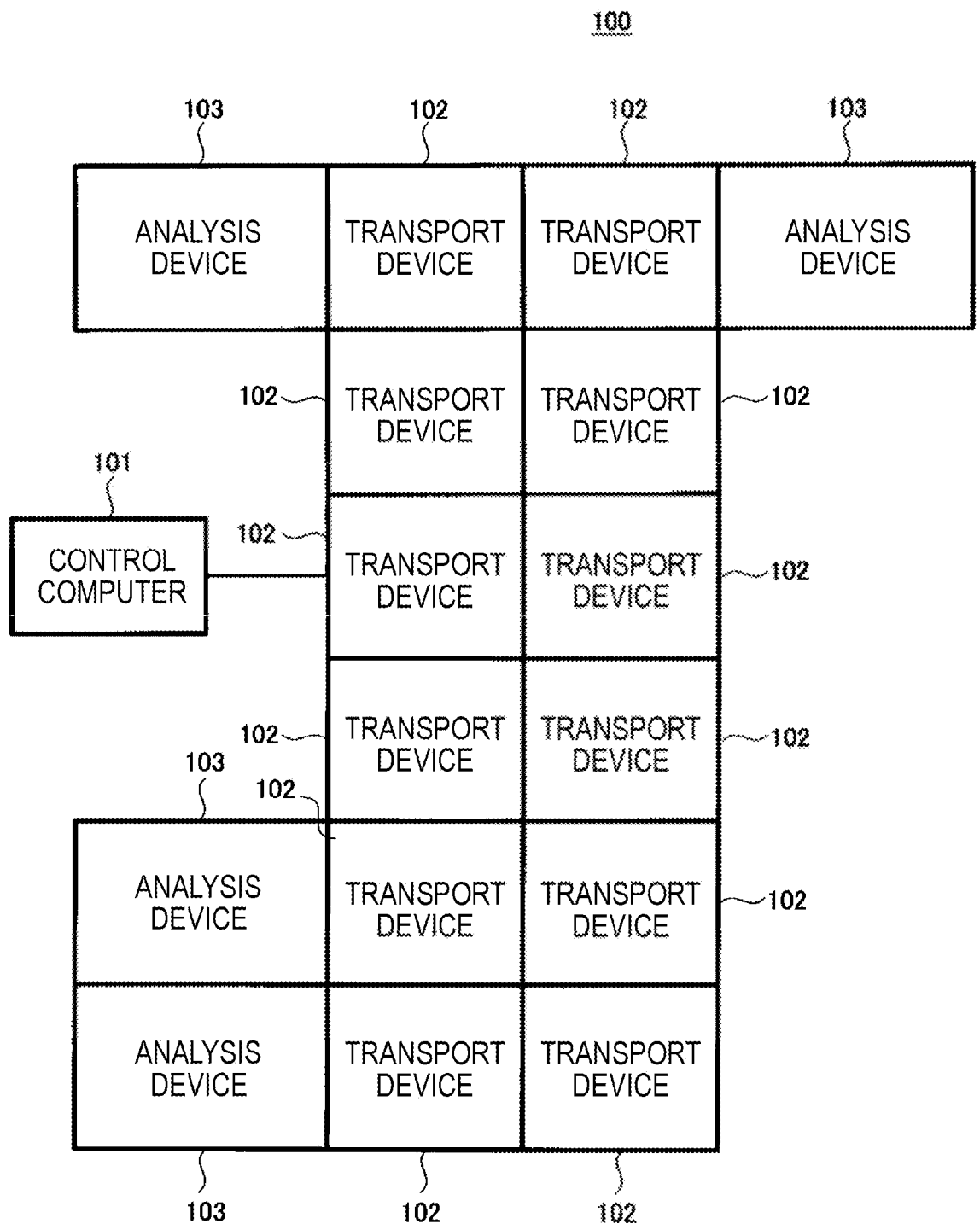

[FIG. 2]
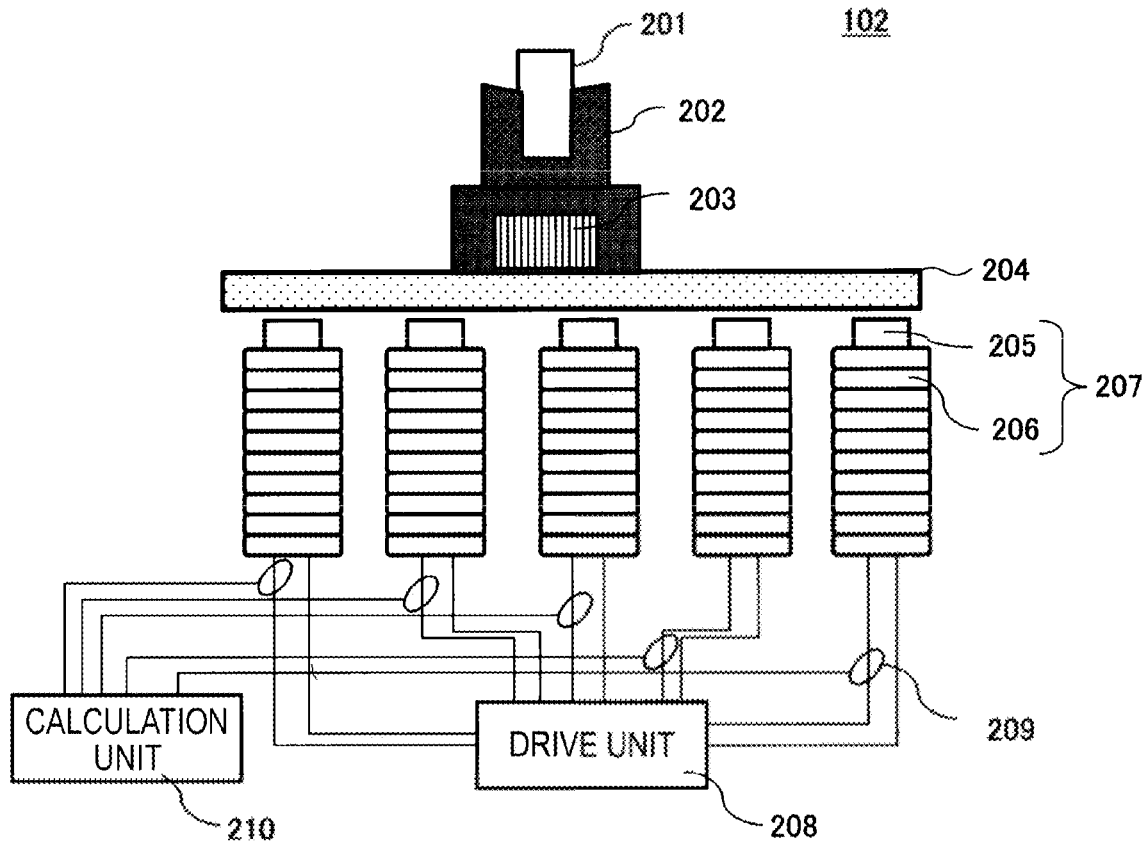
[FIG. 3]
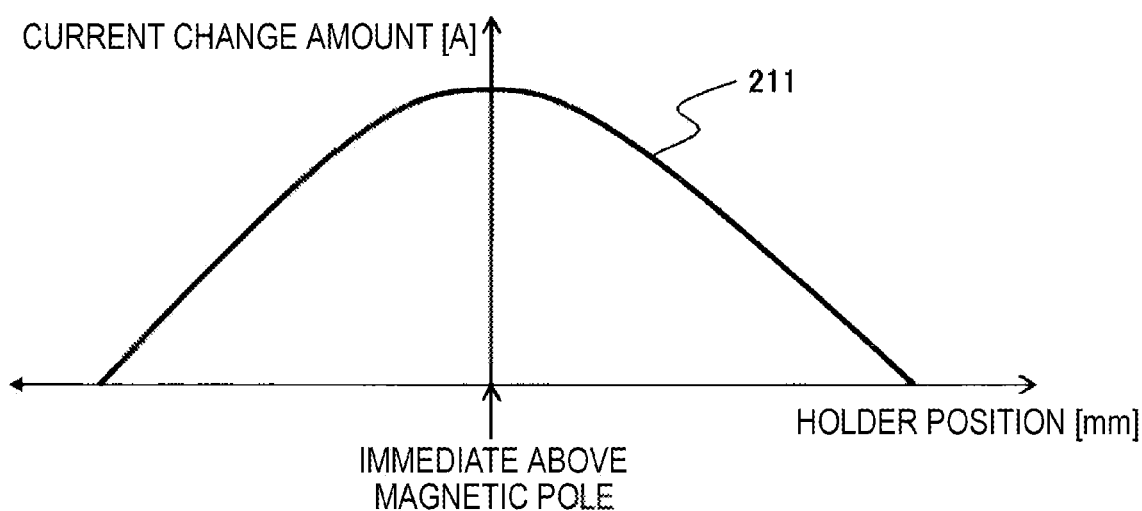

[FIG. 4]
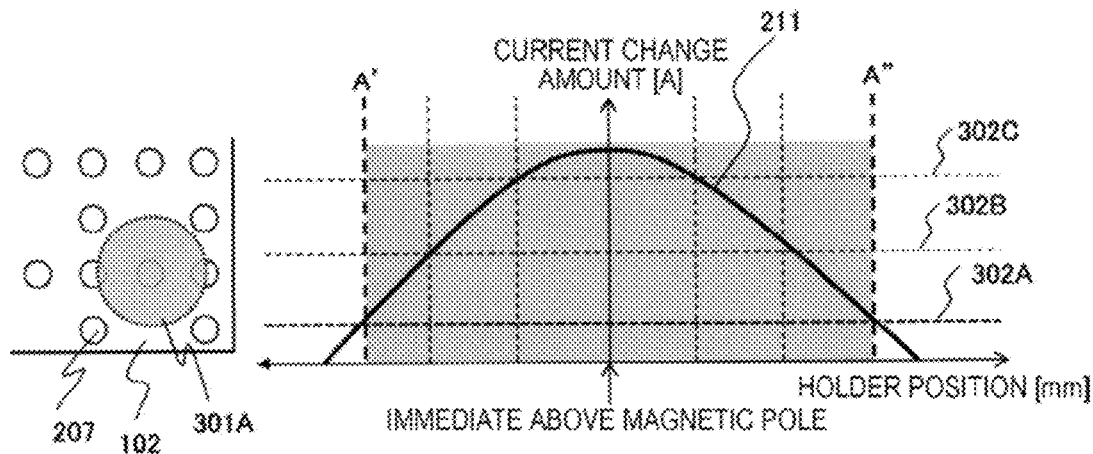
[FIG. 5]
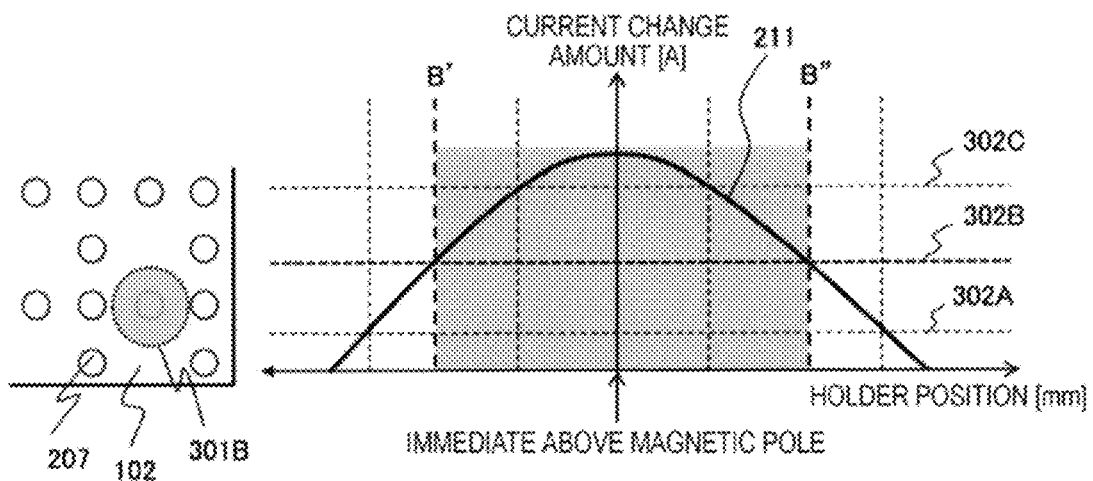
[FIG. 6]
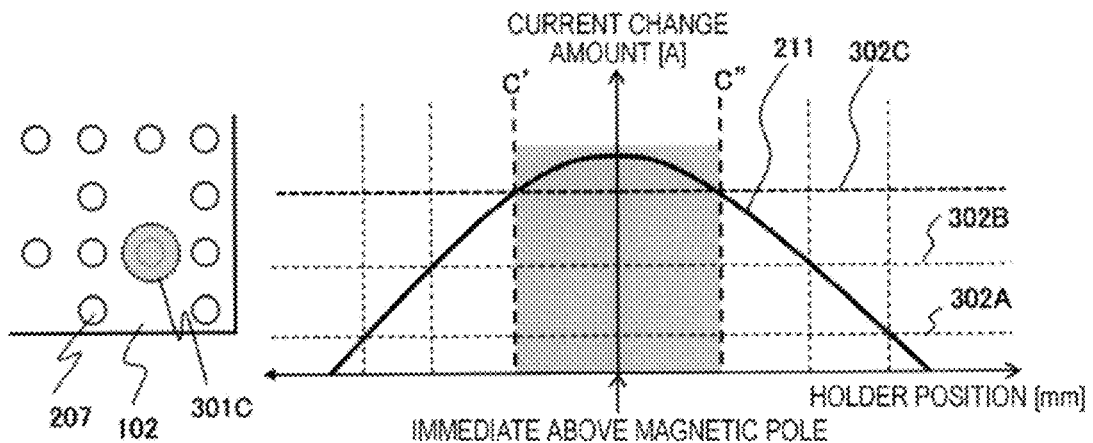

[FIG. 7]
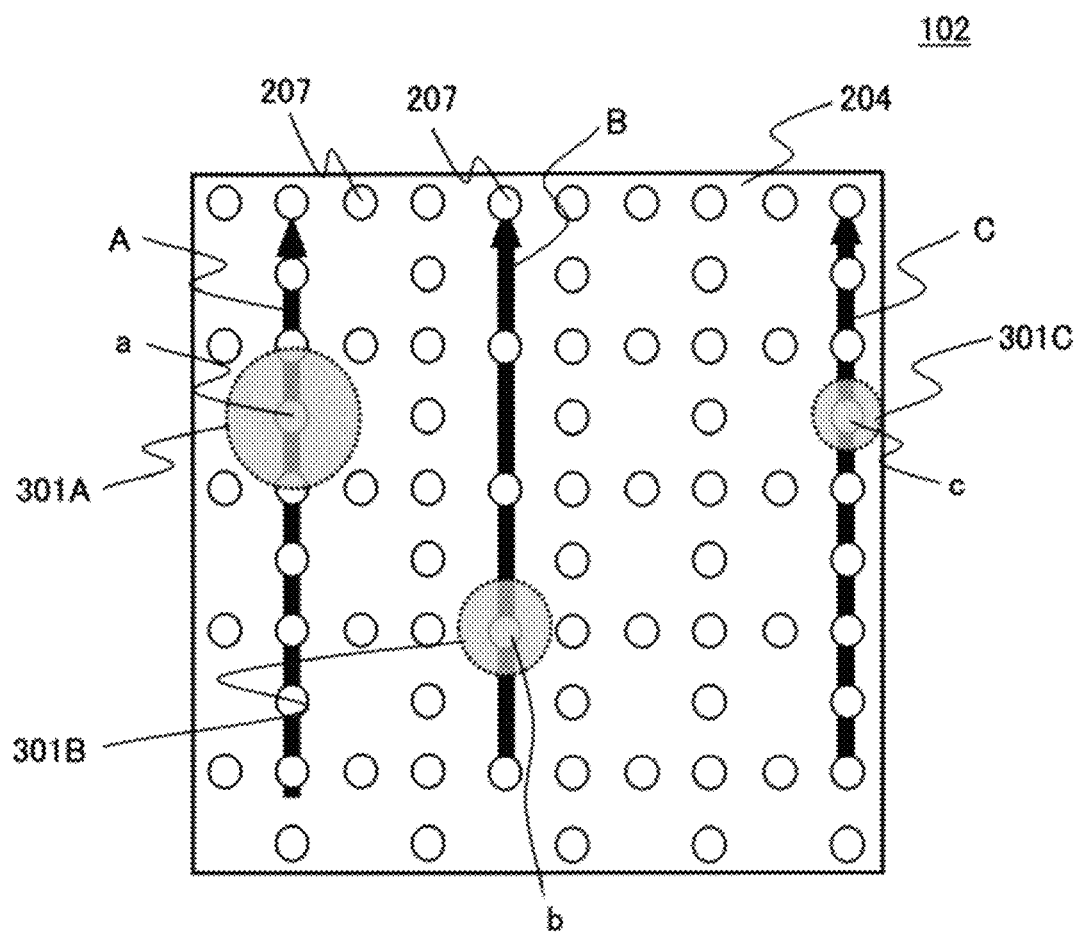

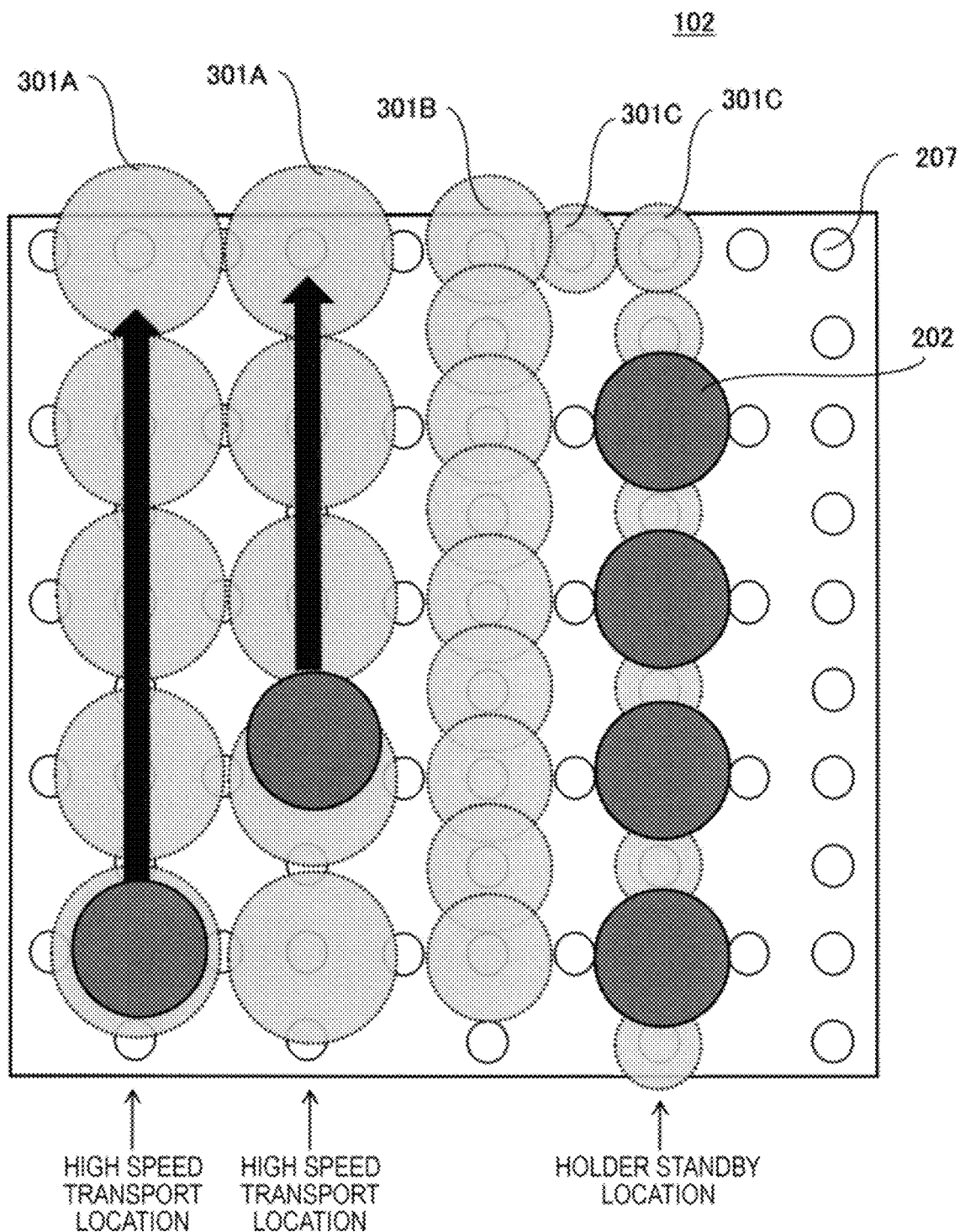

[FIG. 9]
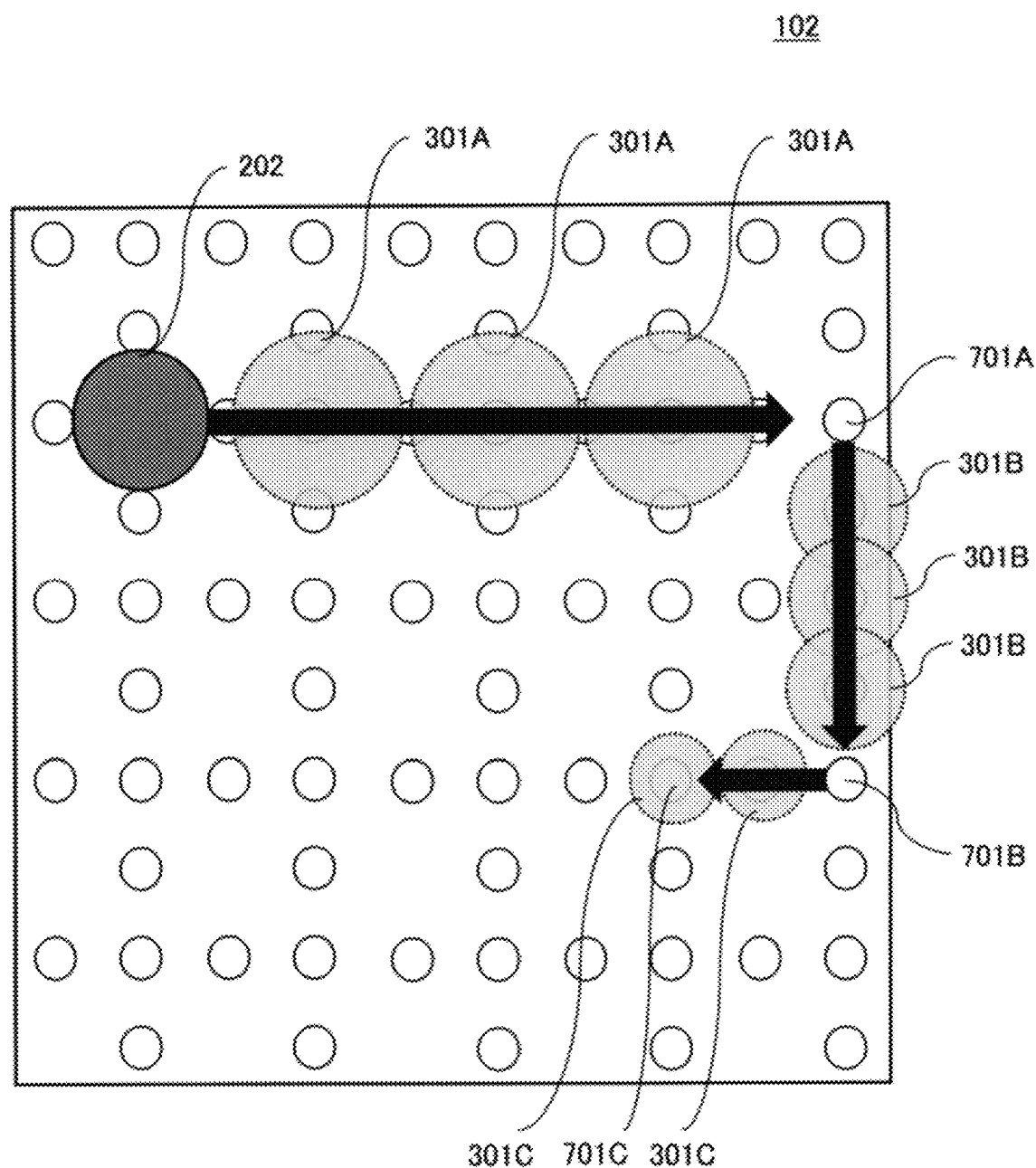

[FIG. 11]
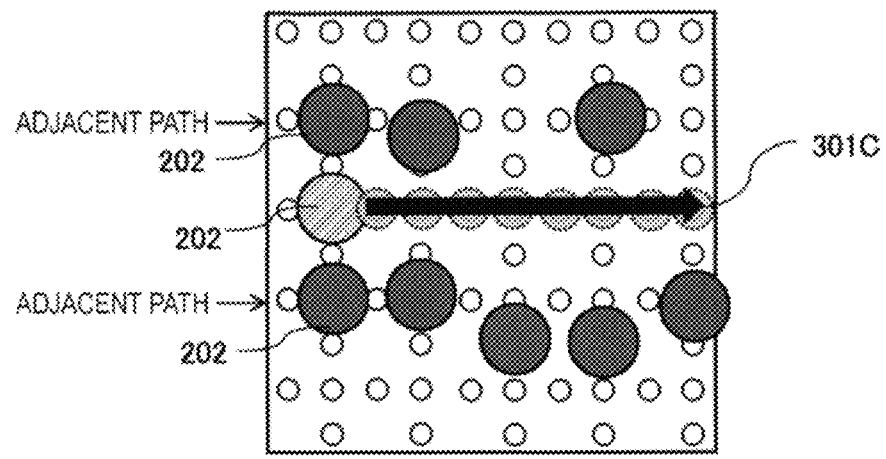
[FIG. 12]
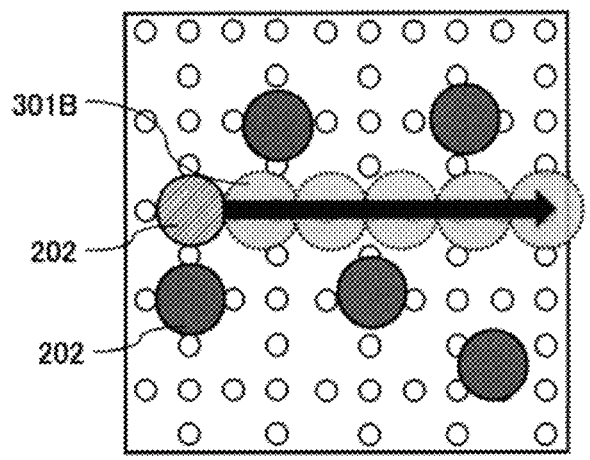
[FIG. 13]
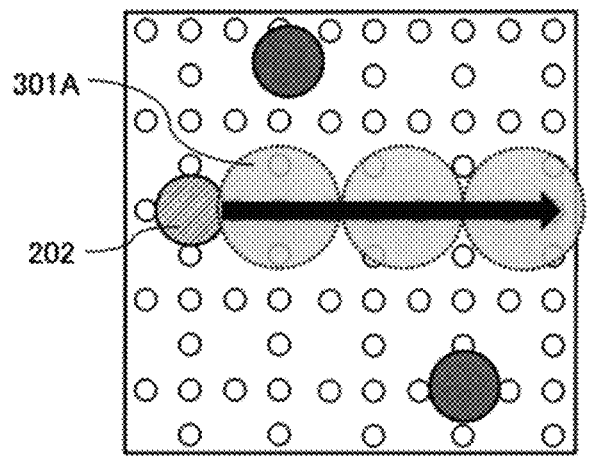

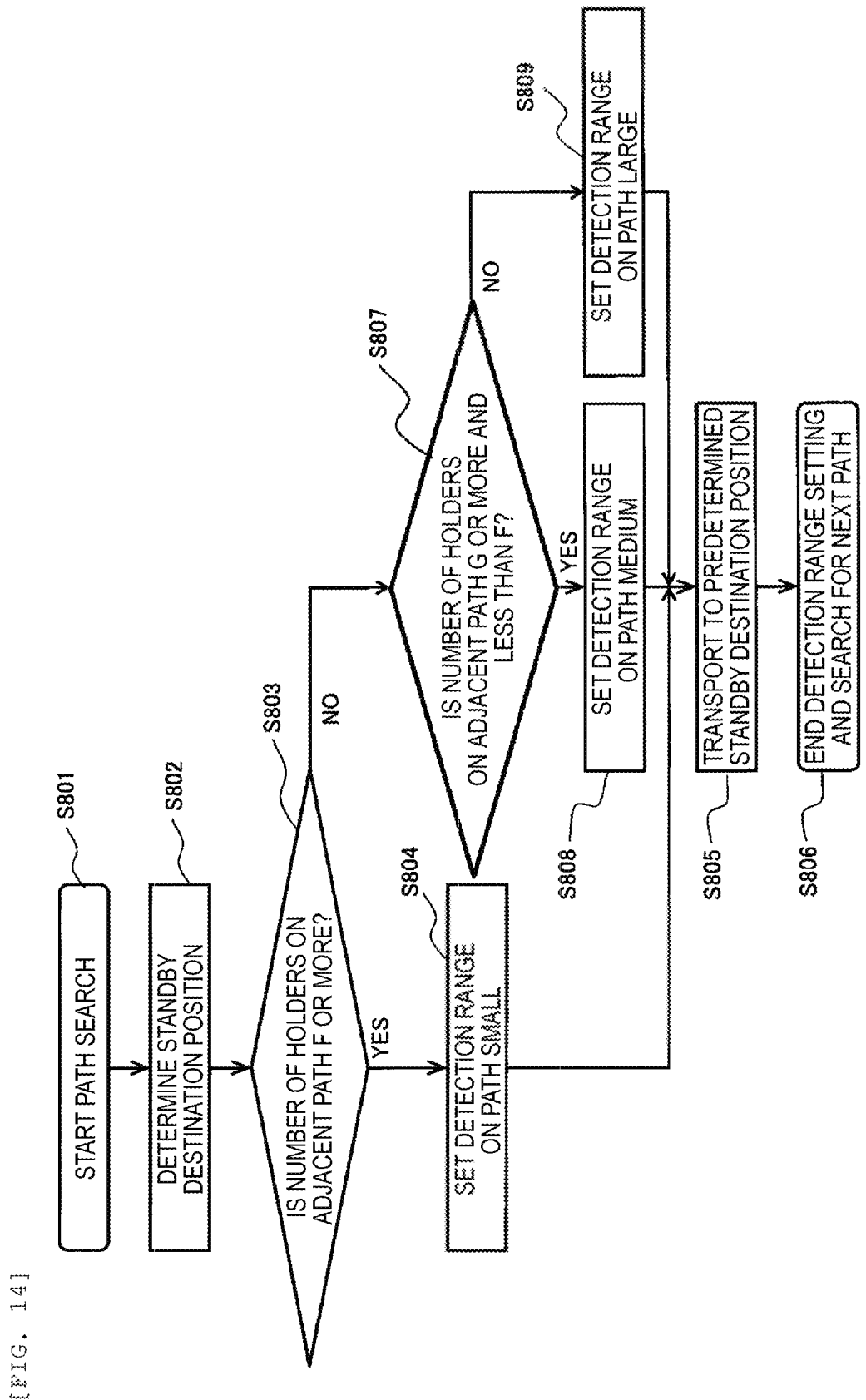

SPECIMEN TRANSPORT SYSTEM AND SPECIMEN TRANSPORT METHOD

TECHNICAL FIELD

The present invention relates to a specimen transport system and a specimen transport method in a specimen analysis device that analyzes a biological sample (hereinafter, referred to as a specimen) such as blood, plasma, serum, urine, and other body fluid, or a specimen pretreatment device that performs a pretreatment necessary for analysis.

BACKGROUND ART

As an example of a laboratory sample delivery system, which is very flexible and gives high transport performance, and a corresponding operation method, PTL 1 discloses a laboratory sample delivery system including several container carriers, each of the container carriers including at least one magnetically active device, preferably at least one permanent magnet and being adapted to transport a sample container, a transport plane adapted to transport the container carriers, and several electromagnetic actuators disposed to be stationary below the transport plane and adapted to move the container carriers on the transport plane by applying a magnetic force to the container carriers.

As an example of an inspection chamber sample distribution system in which a position on a transfer surface can be recognized, PTL 2 describes an inspection chamber sample distribution system including a transfer surface, a plurality of sample container carriers, a drive unit configured to move the sample container carriers on the transfer surface, and a control device configured to control the movement of the sample container carriers on the transfer surface by driving the drive unit such that the sample container carriers move along a corresponding transfer path. A plurality of optically recognizable geometric shapes are placed on the transfer surface, and each of the geometric shapes represents a dedicated field on the transfer surface.

CITATION LIST

Patent Literature

PTL 1: JP-A-2017-77971
PTL 2: JP-A-2018-119962

SUMMARY OF INVENTION

Technical Problem

As a specimen treatment system for automatically analyzing a specimen which is a biological sample such as blood or urine, there are a specimen pretreatment system that performs input, centrifugation, dispensing, labeling, and the like of a specimen, and an automatic analysis system that analyzes a specimen treated by such a specimen pretreatment system.

Specimen pretreatment systems and automatic analysis systems in the related art include a specimen transport line using a belt conveyor or the like in order to transport a specimen to a mechanism that performs a predetermined treatment and analysis. By mounting a plurality of such transport lines on the specimen transport system, the specimen is transported to a predetermined mechanism.

PTL 1 discloses the laboratory sample delivery system that is very flexible and gives high transport performance.

The technique described in PTL 2 is an example of the specimen transport method. PTL 2 discloses that a position sensor that detects a position of a permanent magnet installed in a holder on which a specimen vessel containing a specimen is mounted is provided, and by transporting the holder by exciting an electromagnetic actuator corresponding to a direction in which the specimen is to be transported according to position information detected by the position sensor, the specimen is transported to a desired position.

In a specimen transport system using an electromagnetic actuator, as described in PTL 2, after the position information of the specimen is detected, the holder is transported by exciting the electromagnetic actuator existing in the direction in which the specimen is to be transported. By repeating this operation, the holder is transported to a predetermined position.

Therefore, when the detection of the position information is delayed, a transport speed of the holder may be delayed.

When performing transporting at a location where holders are densely disposed, collisions between the holders or erroneous detection of an adjacent holder may occur when accurate position information is not detected.

In this regard, in the technique described in PTL 2, the position sensor is used for detecting the position information of the specimen, but a detection range of the position sensor is not considered. It has become clear by the study of the present inventors that it is necessary to improve a detection accuracy for the holder in implementing the specimen transport at higher speed and higher accuracy.

Therefore, the invention provides a specimen transport system and a specimen transport method that support a transport method using an electromagnetic actuator and can transport a specimen at higher speed and more stably as compared to the related art.

Solution to Problem

The invention includes a plurality of means for solving the above problems, and an example thereof is a specimen transport system that transports a specimen mounted on a specimen holder by sliding on a transport path by an interaction between a magnetic body and an electromagnet provided in the specimen holder. The specimen transport system includes a plurality of detection points each configured by the electromagnet and detecting a position of the magnetic body, and a plurality of transport paths provided above the plurality of detection points so as to cover the plurality of detection points. A detection range at a first detection point constituting a first transport path is different from a detection range at a second detection point constituting a second transport path different from the first transport path, among the plurality of transport paths.

Advantageous Effects of Invention

According to the invention, it is possible to provide a transport method using an electromagnetic actuator, and transport a specimen at higher speed and more stably as compared to the related art. Problems, configurations, and effects other than those described above will be further clarified with the following description of embodiments.

BRIEF DESCRIPTION OF DRAWINGS

FIG. 1 is a schematic plan view showing a configuration of the entire specimen transport system according to Example 1 of the invention.

FIG. 2 is a diagram showing a schematic configuration of a transport device configuring the specimen transport system according to Example 1.

FIG. 3 is a diagram showing an example of a current change curve obtained by the transport device according to Example 1.

FIG. 4 is a schematic diagram showing an example of a method of setting a detection range in the transport device according to Example 1.

FIG. 5 is a schematic diagram showing an example of the method of setting a detection range in the transport device according to Example 1.

FIG. 6 is a schematic diagram showing an example of the method of setting a detection range in the transport device according to Example 1.

FIG. 7 is a diagram showing a state of a partial upper surface of the transport device according to Example 1.

FIG. 8 is a diagram showing an example of an outline of detection range setting in a transport device configuring a specimen transport system according to Example 2 of the invention.

FIG. 9 is a diagram showing an example of an outline of detection range setting in a transport device configuring a specimen transport system according to Example 3 of the invention.

FIG. 11 is a diagram showing an example of an outline of detection range setting in a transport device configuring a specimen transport system according to Example 4 of the invention.

FIG. 12 is a diagram showing an example of an outline of detection range setting in the transport device according to Example 4.

FIG. 13 is a diagram showing an example of an outline of detection range setting in the transport device according to Example 4.

FIG. 14 is a flowchart illustrating a procedure for setting a detection range in the transport device according to Example 4.

DESCRIPTION OF EMBODIMENTS

Figure 10:
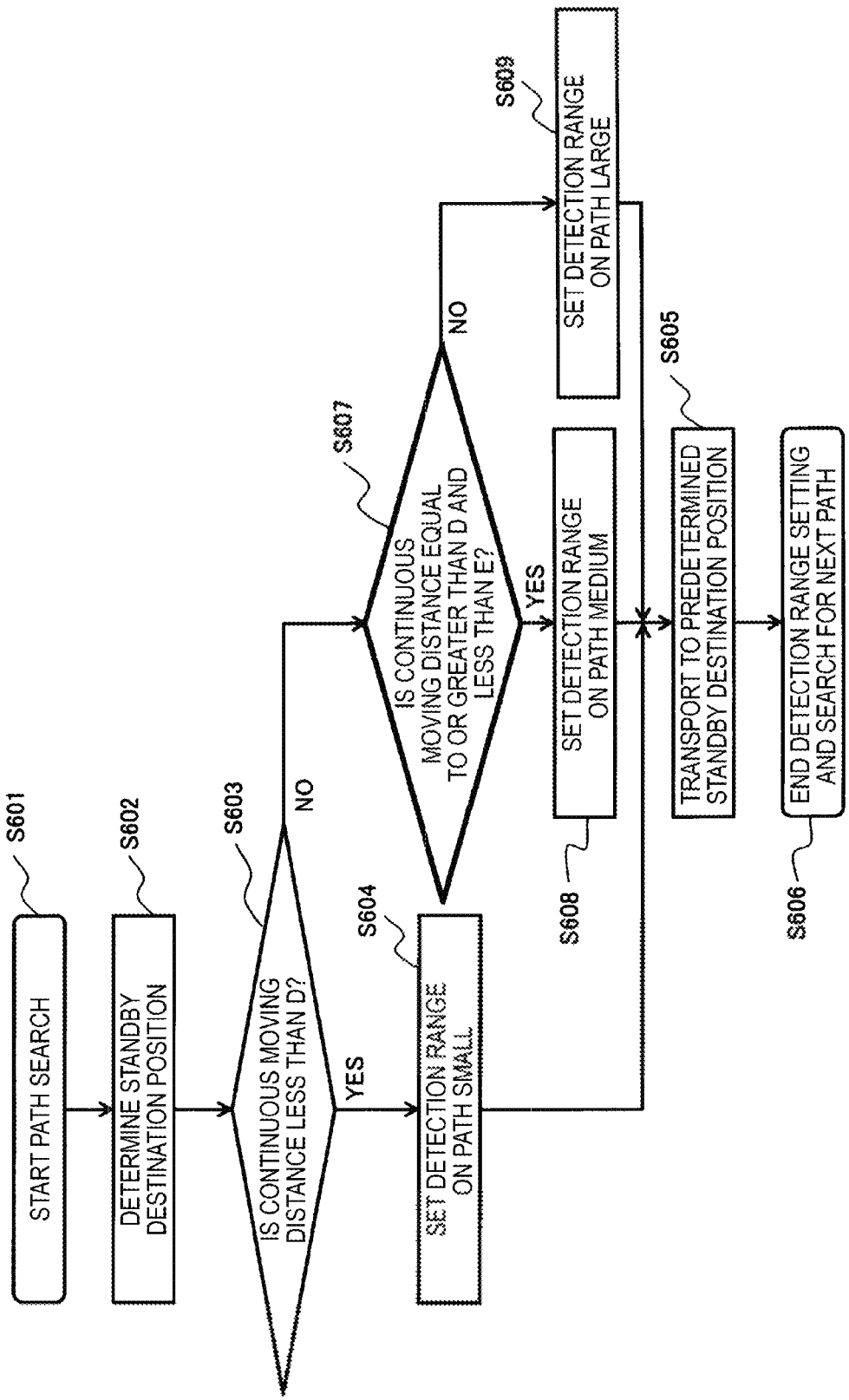
FIG. 10 is a flowchart illustrating a procedure for setting a detection range in the transport device according to Example 3.

Hereinafter, examples of a specimen transport system and a specimen transport method of the invention will be described with reference to the drawings.

Example 1

A specimen transport system and a specimen transport method according to Example 1 of the invention will be described with reference to FIGS. 1 to 7.

First, an overall configuration of the specimen transport system will be described with reference to FIG. 1. FIG. 1 is a plan view showing a configuration of the entire specimen transport system according to Example 1 of the invention.

A specimen transport system 100 according to Example 1 shown in FIG. 1 is a system provided with an analysis device for automatically analyzing components of a specimen such as blood or urine.

Main components of the specimen transport system 100 include a holder 202 (see FIG. 2) on which a specimen vessel 201 (see FIG. 2) containing a specimen such as blood or urine is mounted, or a plurality of (12 in FIG. 1) transport devices 102 that transport an empty holder, a plurality of (4 in FIG. 1) analysis devices 103, and a control computer 101 that integrally manages the specimen transport system 100.

The analysis device 103 is a unit for performing qualitative and quantitative analysis of components of a specimen transported by the transport device 102. Analysis items in this unit are not particularly limited, and a configuration of a known automatic analysis device that analyzes biochemical items and immune items can be adopted. Further, when a plurality of analysis devices 103 are provided, the analysis devices 103 may have the same specifications or different specifications, and the specifications are not particularly limited.

Each of the transport devices 102 is a device that transports a specimen mounted on the holder 202 to a destination by sliding on a transport path by an interaction between a magnetic body 203 (see FIG. 2) provided on the holder 202 and magnetic poles 207 (see FIG. 2). The details will be described with reference to FIG. 2 and the subsequent drawings.

The control computer 101 controls an operation of the entire system including the transport devices 102 and the analysis devices 103, and is implemented by a computer including a display device such as a liquid crystal display, an input device, a storage device, a CPU, a memory, and the like. The control of the operation of each device by the control computer 101 is executed based on various programs recorded in the storage device.

A control processing for the operation executed by the control computer 101 may be integrated into one program, may be divided into a plurality of programs, or may be a combination thereof. A part or all of the programs may be implemented by dedicated hardware or may be modularized.

In the control computer 101 of the present example, detection ranges 301A, 301B, and 301C at a plurality of detection points are determined for each setting of transport of the holder 202 to the analysis device 103. The details thereof will be described later.

In FIG. 1 described above, the case where four analysis devices 103 are provided is described, and the number of the analysis devices is not particularly limited and may be one or more. Similarly, the number of the transport devices 102 is not particularly limited and may be one or more.

The specimen transport system 100 can be provided with various specimen pretreatment and post-treatment units that perform pretreatment and post-treatment on a specimen. A detailed configuration of the specimen pretreatment and post-treatment units is not particularly limited, and a configuration of a known pretreatment device can be adopted.

Next, a specific configuration of the transport device 102 of the present example will be described with reference to FIGS. 2 to 7. FIG. 2 is a configuration diagram showing an outline of the transport device 102. FIG. 3 is a diagram showing an example of a current change curve obtained in the transport device. FIGS. 4 to 6 are schematic diagrams each showing an example of a method of setting a detection range in the transport device. FIG. 7 is a diagram showing a state of a partial upper surface of the transport device.

In FIG. 2, a plurality of holders 202 on which the specimen vessel 201 containing a specimen is installed are provided in the transport device 102. The magnetic body 203 is provided on a bottom surface portion of each of the plurality of holders 202.

The magnetic body 203 is formed of, for example, a permanent magnet such as neodymium or ferrite. The magnetic body 203 can also be formed of other magnets and soft magnetic bodies, and can be formed of appropriate combinations thereof.

Although it is not necessary to provide the magnetic body 203 on a lower surface of the holder 202, the magnetic body 203 is preferably provided on the lower surface from the viewpoint of efficiently applying a transport force of electromagnetic transport.

The holder 202 including the magnetic body 203 moves in a sliding manner on a transport surface 204. In order to generate the transport force, a plurality of magnetic poles 207 each including a cylindrical core 205 and a winding 206 wound around an outer periphery of the core 205 are provided below the transport surface 204. The magnetic poles 207 constitute the plurality of detection points for detecting a position of the magnetic body 203. A plurality of transport paths are provided above the magnetic poles 207 so as to cover the magnetic poles 207.

In the transport device 102 of the present example, the plurality of magnetic poles 207 provided therein are used to detect the position of the magnetic body 203 and are also used to transport the magnetic body 203, that is, to transport a specimen.

In the present example, specifications of the magnetic poles 207 in the transport device 102 are the same for all the magnetic poles 207, but the specifications are not necessarily the same.

The magnetic pole 207 is connected to a drive unit 208 that applies a predetermined voltage to the magnetic pole 207 to cause a predetermined current to flow through the winding 206. The magnetic pole 207 to which the voltage is applied by the drive unit 208 acts as an electromagnet, and attracts the magnetic body 203 in the holder 202 on the transport surface 204. After the holder 202 is attracted by the magnetic pole 207, the voltage applied to the magnetic pole 207 by the drive unit 208 is stopped, and the voltage is applied by the drive unit 208 to a different magnetic pole 207 adjacent to the magnetic pole 207 in the same manner as described above, so that the magnetic body 203 in the holder 202 is attracted to the adjacent magnetic pole 207.

This procedure is repeated for all the magnetic poles 207 constituting the transport paths to transport a specimen contained in the specimen vessel 201, which is held by the holder 202 provided with the magnetic body 203, to a destination.

The current flowing through the winding 206 of the magnetic pole 207 in transport is detected by a current detection unit 209. The current flowing through the winding 206 of the magnetic pole 207 detected by the current detection unit 209 is sent to a calculation unit 210 to be digitized, and a current change amount curve 211 depending on a position of a specimen holder as shown in FIG. 3 is acquired. By acquiring the current change amount curve 211 depending on a position of the holder 202, the position of the holder 202 can be detected.

The calculation unit 210 specifies, based on a command from the control computer 101, a position of a specimen based on the current change amount curve 211. The position detection processing may be executed by the calculation unit 210 or the control computer 101, and in the present example, various settings during the position detection are determined in the control computer 101 and executed by the calculation unit 210.

In addition, the calculation unit 210 calculates the current flowing through each of the windings 206 using various kinds of information such as position information, speed information, and weight information of the holder 202, and outputs a command signal to the drive unit 208. The drive unit 208 applies a voltage to the corresponding winding 206 based on the command signal.

Next, an example of setting of a position detection range will be described with reference to FIGS. 4 to 6.

In the present example, thresholds 302A, 302B, and 302C for calculating the position of the magnetic body 203 by obtaining the current change amount curve 211 based on a current value detected by the current detection unit 209 are set to different values for the transport paths, so that a range in which the position of the holder 202 is specified is different for the transport paths.

For example, as shown in FIG. 4, with respect to the detection range 301A of the magnetic pole 207 disposed at a position a constituting a transport path A in the transport device 102 shown in FIG. 7, the detection determination threshold 302A is set to be smaller than the detection determination thresholds 302B and 302C described later. By lowering the detection determination threshold 302A in this way, an intersection distance A'-A" between the current change amount curve 211 and a straight line of the detection determination threshold 302A is longer, and the detection range 301A can be set wider than the detection ranges 301B and 301C described later.

In addition, as shown in FIG. 5, with respect to the detection range 301B of the magnetic pole 207 disposed at a position b constituting a transport path B in the transport device 102 shown in FIG. 7, the detection determination threshold 302B is set to a value larger than the detection determination threshold 302A and smaller than the detection determination threshold 302C. Accordingly, an intersection distance B'-B" between the current change amount curve 211 and a straight line of the detection determination threshold 302B is shorter than the intersection distance A'-A" between the current change amount curve 211 and the straight line of the detection determination threshold 302A, and it is possible to set the detection range 301B narrower than the detection range 301A at the magnetic pole 207 belonging to the transport path A and wider than the detection range 301C at the magnetic pole 207 belonging to a transport path C.

Further, as shown in FIG. 6, with respect to the detection range 301C of the magnetic pole 207 disposed at a position c constituting the transport path C in the transport device 102 shown in FIG. 7, the detection determination threshold 302C is set to a value larger than the detection determination thresholds 302A and 302B as in the above cases. Accordingly, an intersection distance C'-C" between the current change amount curve 211 and a straight line of the detection determination threshold 302C is shorter than the intersection distance A'-A" and the intersection distance B'-B", and it is possible to set the detection range 301C narrower than the detection range 301A of the magnetic pole 207 belonging to the transport path A and the detection range 301B of the magnetic pole 207 belonging to the transport path B.

With such settings, as shown in FIG. 7, in the transport device 102 in which a plurality of magnetic poles 207 serving as position detection points are disposed in a lattice pattern below the transport surface 204 of FIG. 7, the plurality of magnetic poles 207 disposed are configured such that the position of the holder 202 can be specified individually in any of the detection ranges 301A, 301B, and 301C.

Any of the detection ranges 301A, 301B, and 301C preferably overlaps the others of detection ranges 301A, 301B, and 301C. Accordingly, the holder 202 can be prevented from being lost as much as possible as the holder 202 is positioned in a narrow carry-out range, and it is possible to achieve more stable transport.

Each of the detection range 301A at the position a, the detection range 301B at the position b, and the detection range 301C at the position c is not necessarily fixed all the times during the transport of a specimen, and even at the same position, the detection range 301A, the detection range 301B, and the detection range 301C can be changed as needed according to a transport situation.

For example, the detection ranges 301A, 301B, and 301C can be changed according to the setting of the transport of the holder 202, more specifically, according to a transport speed or a transport density of the magnetic poles 207. This enables stable speed control and avoidance of erroneous detection and collision of the holder 202.

When the ranges of the detection ranges 301A, 301B, and 301C are changed, the values of the detection determination thresholds 302A, 302B, and 302C can be set according to a command signal for setting change from the control computer 101.

In FIG. 3, the case where the detection range is set to three types of large, medium, and small has been described, and the detection range may be set to at least two types or more, and may be set to four types or more.

When two types of detection ranges are provided or four or more types of detection ranges are provided, setting of two types or four or more types of detection ranges can be implemented in the specimen transport system 100 or the transport device 102 by changing the value of the detection determination threshold in each of the detection ranges, as in FIGS. 4 to 6.

In the above embodiment, the embodiment in which the detection range setting is changed by changing the detection determination thresholds 302A, 302B, and 302C has been described, and the detection ranges 301A, 301B, and 301C can be set to different ranges for respective transport paths by changing a period of a pulse voltage for position detection applied to the magnetic pole 207 by the drive unit 208. In this case, when it is desired to widen the detection range, the period of the applied pulse voltage is lengthened, and when it is desired to narrow the range, the period is shortened.

Such a change in the period of the pulse voltage applied to the magnetic pole 207 can also be made according to a command signal for setting change from the control computer 101, as in the case of setting the detection determination thresholds 302A, 302B, and 302C.

Next, effects of the present example will be described.

The specimen transport system 100 according to Example 1 of the invention described above includes a plurality of detection points each formed of the magnetic pole 207 and configured to detect a position of the magnetic body 203, and the plurality of transport paths A, B, and C provided above the plurality of detection points so as to cover the plurality of detection points. Among the plurality of transport paths A, B, and C, a detection range at a first detection point constituting a first transport path is different from a detection range at a second detection point constituting a second transport path different from the first transport path.

Thus, in a transport method using an electromagnetic actuator that slides the holder 202 on a transport path by an interaction between the magnetic body 203 and the magnetic pole 207, for example, since the detection range is different depending on transport conditions, the position of the holder 202 can be obtained at higher speed and more stably as compared to the related art without providing a mechanism that detects the holder 202 on the transport surface 204.

Therefore, it is possible to implement a high speed and stable specimen transport system and specimen transport method in which delays or erroneous detection in the position detection for the holder 202 is prevented as compared to the related art.

In addition, since the detection ranges 301A, 301B, and 301C at the first detection point and the second detection point are different from each other based on the setting of the transport of a specimen, it is possible to set a detection range suitable for implementing the transport according to situations and plans of analysis of the specimen, and it is possible to implement further stable specimen transport at higher speed.

Further, since the detection ranges 301A, 301B, and 301C are different from each other due to a difference in the transport density or a difference in the transport speed of the holder 202, it is possible to prevent transport trouble such as contact between the holders 202 as compared to the related art, and thus it is possible to implement further stable specimen transport.

The analysis device 103 that analyzes a specimen and the control computer 101 that controls the detection points and an operation of the analysis device 103 are further provided. The control computer 101 determines the detection ranges 301A, 301B, and 301C of the plurality of detection points for each setting of transport of the holder 202 to the analysis device 103, so that even during the analysis of a specimen, it is possible to set a detection range suitable for implementing the transport according to situations and plans of analysis of the specimen, and thus it is possible to implement further stable specimen transport.

Further, since the current detection unit 209 that detects a value of a current flowing through the magnetic pole 207 of each of the plurality of detection points is further provided, and the thresholds 302A, 302B, and 302C for calculating the position of the magnetic body 203 based on the current value detected by the current detection unit 209 are different between the first detection point and the second detection point, it is possible to change the detection range without changing the setting of a pulse voltage for driving or a pulse voltage for position detection, and thus it is possible to implement further stable specimen transport.

Since the drive unit 208 that applies a voltage to the magnetic pole 207 is further provided, and a period of a pulse voltage applied to the magnetic pole 207 by the drive unit 208 is different between the first detection point and the second detection point, it is possible to change the detection range without changing the setting of the pulse voltage for driving, and thus it is possible to implement further stable specimen transport.

Further, the control computer 101 changes the detection range at the first detection point and the detection range at the second detection point according to a transport situation, thereby obtaining an effect that it is possible to flexibly cope with a case where it is necessary to change the transport situation according to progress situations of analysis such as the input of an emergency specimen and analysis concentration of the specific analysis device 103 or situations necessary for analysis results.

Example 2

A specimen transport system and a specimen transport method according to Example 2 of the invention will be described with reference to FIG. 8. FIG. 8 is a schematic diagram showing an example in which detection range setting is changed depending on a transport location of the transport device 102 in the present example.

The same components as those of Example 1 are denoted by the same reference numerals, and the description thereof will be omitted. The same applies to the following examples.

In the specimen transport system and the specimen transport method of the present example, the detection ranges 301A, 301B, and 301C are set to different ranges due to a difference in a position of a first transport path or a second transport path.

More specifically, as shown in FIG. 8, in a place where retention of the holder 202 is likely to occur or a place where retention is expected, such as an inlet and outlet location, a specimen input location, or a specimen standby location of the analysis device 103 in the specimen transport system 100, a detection range at a detection point is narrowed, and the detection determination threshold 302C is set so as to have the detection range 301C or a pulse voltage for position detection is set, as described in Example 1, for example.

By narrowing the detection range in this way, a detection sensitivity at each detection point is increased, and it is possible to detect a minute position change of the holder 202. Therefore, it is possible to implement transport in which trouble such as contact between the holders 202 is more reliably prevented, and it is possible to implement further stable specimen transport.

On the other hand, in a place where the holder 202 is assumed to move at a high speed, such as an emergency specimen transport path, since there is a high demand for early detection of the holder 202 moving at a high speed, the detection range at the detection point is widened, and the detection determination threshold 302A is set so as to have the detection range 301A or the pulse voltage for position detection is set, as described in Example 1, for example.

By widening the detection range in this way, it is possible to quickly detect the approach of the holder 202 to the detection point, and it is possible to quickly switch a voltage application to the magnetic pole 207 for transporting the holder 202. Thus, it is possible to more reliably achieve a high transport speed.

The detection determination threshold 302B is set so as to have the detection range 301B or the pulse voltage for position detection is set, as described in Example 1, for example, such that in an intermediate portion connecting a high speed transport location and a retention location, the approach of the holder 202 can be detected quickly to some extent and can be detected with high sensitivity.

Other configurations and operations are substantially the same as those of the specimen transport system and the specimen transport method of Example 1 described above, and detailed description thereof will be omitted.

The specimen transport system and the specimen transport method of Example 2 of the invention can also obtain substantially the same effects as those of the specimen transport system and the specimen transport method of Example 1 described above.

When the detection ranges 301A, 301B, and 301C are different due to a difference in the position of the first transport path or the second transport path, it is possible to implement specimen transport at higher speed and more stably.

In the present example, the detection range does not necessarily have three types either, and may have two types or four or more types.

Example 3

A specimen transport system and a specimen transport method according to Example 3 of the invention will be described with reference to FIGS. 9 and 10. FIG. 9 is a schematic top view of the transport device 102 showing detection range setting based on a moving distance in the present example. FIG. 10 is a flowchart showing a method of setting a detection range that varies depending on the moving distance in the present example.

In the specimen transport system and the specimen transport method of the present example, the detection ranges 301A, 301B, and 301C are set to be different depending on a difference in a continuous transport distance of the holder 202.

For example, in FIG. 9, when a distance by which the holder 202 moves without temporary stop, that is, a distance to a next standby destination position 701C is less than a predetermined distance D, it is not necessary to perform transport at a high speed, and thus the detection range 301C, which has a small detection range on a transport path to the standby destination position 701C, is set.

In addition, when a distance of the holder 202 to a predetermined standby destination position 701B is equal to or greater than D and is less than a predetermined value E greater than D, the detection range 301B, which is a medium size detection range on a transport path to the standby destination position 701B, is set.

Further, in a case other than the above conditions, that is, in a case where a distance of the holder 202 to a standby destination position 701A is equal to or greater than E, since there are many cases where high speed transport is required, the detection range 301A, which has a large detection range on a transport path to the standby destination position 701A, is set.

It is desirable that the moving distances D and E shown in FIG. 9 can be set by the control computer 101 or set by a manufacturer of the specimen transport system 100.

The flow of the detection range as described above will be described below with reference to FIG. 10.

First, the control computer 101 starts searching for a transport path to a predetermined target position of one holder 202 (step S601), and determines a next position from the standby destination positions 701A, 701B, and 701C (step S602).

Next, the control computer 101 determines whether a distance by which the holder 202 is transported to the target position without temporary stop is less than the predetermined distance D (step S603).

When it is determined that the transport distance is less than D, the processing proceeds to step S604, and the control computer 101 sets the detection range 301C as the detection range on the transport path (step S604).

The holder 202 in which the detection range 301C on the transport path is set is transported to a predetermined standby destination position by the action of an electromagnetic force based on a drive signal for transport of the magnetic pole 207 from the control computer 101 (step S605). When the holder 202 is transported to the predetermined standby destination position, the setting of the detection range on the transport path of the holder 202 is completed, and transport path setting and operation to the next standby destination position of the holder 202 is started (step S606).

On the other hand, when it is determined in step S603 that the transport distance is equal to or greater than the distance D, the control computer 101 determines whether the transport distance is equal to or greater than D and less than E (step S607).

When it is determined that the transport distance is equal to or greater than D and less than E, the control computer 101 sets the detection range 301B as the detection range on the transport path (step S608).

The holder 202 in which the detection range 301B on the transport path is set is transported to a predetermined standby destination position under the control of the control computer 101 (step S605), the detection range setting of the holder 202 is completed, and the transport path setting and operation to the next standby destination position of the holder 202 is started (step S606).

On the other hand, when it is determined in step S607 that the transport distance of the holder 202 is not equal to or greater than the predetermined distance D and less than the predetermined distance E, the control computer 101 sets the detection range 301A as the detection range on the transport path (step S609).

The holder 202 in which the detection range 301A on the transport path is set is transported to a predetermined standby destination position under the control of the control computer 101 (step S605), the setting of the detection range 301A of the holder 202 is completed, and the transport path setting and operation to the next standby destination position of the holder 202 is started (step S606).

In FIG. 10, the case where the detection range of the holder 202 is set in three types of large, medium, and small has been described, and in a case where the detection range is two types or four or more types, it is possible to set two types or four or more types of detection ranges in the specimen transport system 100 by determining the moving distance in the same manner.

Other configurations and operations are substantially the same as those of the specimen transport system and the specimen transport method of Example 1 described above, and detailed description thereof will be omitted.

The specimen transport system and the specimen transport method of Example 3 of the invention can also obtain substantially the same effects as those of the specimen transport system and the specimen transport method of Example 1 described above.

Even when the detection ranges 301A, 301B, and 301C are different due to the difference in the continuous transport distance of the holder 202, it is possible to implement specimen transport at higher speed and more stably.

Example 4

A specimen transport system and a specimen transport method according to Example 4 of the invention will be described with reference to FIGS. 11 to 14. FIGS. 11 to 13 are schematic top views of the transport device 102 showing detection range setting based on a transport density in the present example. FIG. 14 is a flowchart showing a method of setting a detection range that varies depending on the transport density in the present example.

In the specimen transport system and the specimen transport method of the present example, an embodiment in which the detection range is set according to the transport density of the holder 202 will be described.

As shown in FIG. 11, when a predetermined number F or more of the holders 202 are present on a transport path adjacent to another holder 202 to be transported, a detection range at a detection point is narrowed to reliably detect each of the holders 202, and the detection determination threshold 302C is set so as to have the detection range 301C, or a pulse voltage for position detection is set, as described in Example 1, for example.

In addition, as shown in FIG. 12, when a predetermined number G (less than F) or more and less than F of other holders 202 are present on the adjacent transport path, the detection determination threshold 302B is set so as to have the detection range 301B or the pulse voltage for position detection is set, as described in Example 1, for example.

Further, as shown in FIG. 13, in a case of conditions other than the two conditions described above, high speed transport is possible since there are few other holders 202 around, and therefore, the detection range at the detection point is widened, and the detection determination threshold 302A is set so as to have the detection range 301A or the pulse voltage for position detection is set, as described in Example 1, for example.

The flow of the detection range as described above will be described below with reference to FIG. 14.

As shown in FIG. 14, first, the control computer 101 starts searching for a transport path to a predetermined target position (standby destination position) of the holder 202 to be transported (step S801), and determines the next standby destination position (step S802).

Next, the control computer 101 determines whether the predetermined number F or more of other holders 202 are present on an adjacent path of the transport path to the predetermined standby destination position of the holder 202 to be transported (step S803).

When it is determined that the number of other holders 202 is F or more, the processing proceeds to step S804, and the control computer 101 sets the detection range 301C as a detection range on the transport path of the holder 202 to be transported (step S804).

The holder 202 in which the detection range 301C on the transport path is set is transported to the predetermined standby destination position by the action of an electromagnetic force based on a drive signal for transport of the magnetic pole 207 from the control computer 101 (step S805). When the holder 202 is transported to the predetermined standby destination position, the setting of the detection range on the transport path of the holder 202 is completed, and transport path setting and operation to the next standby destination position of the holder 202 is started (step S806).

On the other hand, when it is determined in step S803 that the predetermined number F or more of other holders 202 are not present on the adjacent path of the transport path of the holder 202 to be transported, the control computer 101 then determines whether the predetermined value G or more and less than F of other holders 202 are present on the adjacent path of the transport path of the holder 202 to be transported (step S807).

When it is determined that the number of other holders 202 is G or more and less than F, the detection range 301B is set as the detection range on the transport path of the holder 202 to be transported (step S808).

The holder 202 in which the detection range 301B on the transport path is set is transported to a predetermined standby destination position (step S805), the detection range setting of the holder 202 is completed, and the transport path setting and operation to the next standby destination position of the holder 202 is started (step S806).

On the other hand, when it is determined in step S807 that the number of other holders 202 is less than the predetermined value G, the control computer 101 sets the detection range 301A as the detection range of the holder 202 on the transport path (step S809).

The holder 202 in which the detection range 301A on the transport path is set is transported to a predetermined standby destination position under the control of the control computer 101 (step S805), the setting of the detection range 301A of the holder 202 is completed, and the transport path setting and operation to the next standby destination position of the holder 202 is started (step S806).

In FIG. 14, the case where the detection range of the holder 202 is set in three types of large, medium, and small has been described, and in a case where the detection range is two types or four or more types, it is possible to set two types or four or more types of detection ranges in the specimen transport system 100 by determining the transport density of the holder 202 in the same manner.

Other configurations and operations are substantially the same as those of the specimen transport system and the specimen transport method of Example 1 described above, and detailed description thereof will be omitted.

The specimen transport system and the specimen transport method of Example 4 of the invention can also obtain substantially the same effects as those of the specimen transport system and the specimen transport method of Example 1 described above.

Others

The invention is not limited to the above examples, and includes various modifications. The above examples have been described in detail for easy understanding of the invention, and the invention is not necessarily limited to those including all the configurations described above.

A part of a configuration of one example may be replaced with a configuration of another example, and the configuration of another embodiment may be added to the configuration of the one embodiment. A part of the configuration of each example may be added to, deleted from, or replaced with another configuration.

REFERENCE SIGNS LIST

100: specimen transport system
101: control computer
102: transport device
103: analysis device
201: specimen vessel
202: holder
203: magnetic body
204: transport surface
205: core
206: winding
207: magnetic pole (electromagnet, each detection point)
208: drive unit
209: current detection unit
210: calculation unit
211: current change amount curve
301A, 301B, 301C: detection range
302A, 302B, 302C: detection determination threshold
701A, 701B, 701C: standby destination position

The invention claimed is:

1. A specimen transport system that transports a specimen mounted on a specimen holder by sliding on a transport path by an interaction between a plurality of electromagnets and a magnetic body provided in the specimen holder, comprising:
   a plurality of detection points each formed by one of the plurality of electromagnets and configured for detecting a position of the magnetic body;
   a plurality of transport paths provided above the plurality of detection points so as to cover the plurality of detection points;
   a current detection unit configured to detect a current value flowing through the plurality of electromagnets of each of the plurality of detection points; and
   a calculation unit configured to calculate the position of the magnetic body based on the current value detected by the current detection unit,
   wherein a detection range at a first detection point that is part of a first transport path is different from a detection range at a second detection point that is part of a second transport path different from the first transport path, among the plurality of transport paths, and
   wherein a threshold for calculating the position of the magnetic body based on the current value detected by the current detection unit is different between the first detection point and the second detection point.

2. The specimen transport system according to claim 1, wherein
   the detection ranges of the first detection point and the second detection point are different based on the specimen transport setting.

3. The specimen transport system according to claim 2, wherein
   the detection range varies depending on a transport density of the specimen holder.

4. The specimen transport system according to claim 2, wherein
   the detection range varies depending on a position of the first transport path or the second transport path.

5. The specimen transport system according to claim 2, wherein
   the detection range varies depending on a continuous transport distance of the specimen holder.

6. The specimen transport system according to claim 2, wherein
   the detection range varies depending on a transport speed of the specimen holder.

7. The specimen transport system according to claim 1, further comprising:
   an analysis device configured to analyze the specimen; and
   a control computer configured to control the plurality of detection points, and the operation of the analysis device, wherein
   the control computer determines detection ranges of the plurality of detection points for each setting of transport of the specimen holder to the analysis device.

8. The specimen transport system according to claim 7, wherein
   the control computer changes the detection range of the first detection point and the detection range of the second detection point in accordance with a transport situation.

9. The specimen transport system according to claim 1, further comprising:
   a drive unit configured to apply a voltage to the plurality of electromagnets, wherein
   a period of a pulse voltage applied to the plurality of electromagnets by the drive unit is different between the first detection point and the second detection point.

10. A specimen transport method for transporting a specimen mounted on a specimen holder having a magnetic body, comprising:
    providing a plurality of detection points formed by a plurality of electromagnets and configured for detecting a position of the magnetic body, and a plurality of transport paths provided above the plurality of detection points so as to cover the plurality of detection points;

setting a detection range at a first detection point that is part of a first transport path to be different from a detection range at a second detection point that is part of a second transport path different from the first transport path, among the plurality of transport paths;

detecting, via a current detection unit, a current value flowing through the plurality of electromagnets of each of the plurality of detection points;

calculating, via a calculation unit, the position of the magnetic body based on the current value detected by the current detection unit, wherein a threshold for calculating the position of the magnetic body based on the current value detected by the current detection unit is different between the first detection point and the second detection point; and transporting the specimen by sliding the specimen holder on a transport path of the plurality of transport paths by an interaction between the magnetic body and the plurality of electromagnets.

* * * * *